(12) United States Patent
Kress et al.

(10) Patent No.: US 7,322,779 B2
(45) Date of Patent: Jan. 29, 2008

(54) INTERFACE BETWEEN TWO PARTS OF A TOOL SYSTEM

(75) Inventors: Dieter Kress, Aalen (DE); Friedrich Häberle, Lauchheim (DE)

(73) Assignee: MAPAL Fabrik fur Prazisionswerkzeuge, Aalen (DE)

( * ) Notice: Subject to any disclaimer, the term of this patent is extended or adjusted under 35 U.S.C. 154(b) by 0 days.

(21) Appl. No.: 10/560,944

(22) PCT Filed: May 29, 2004

(86) PCT No.: PCT/EP2004/005844

§ 371 (c)(1),
(2), (4) Date: Dec. 15, 2005

(87) PCT Pub. No.: WO2004/113001

PCT Pub. Date: Dec. 29, 2004

(65) Prior Publication Data

US 2006/0140736 A1    Jun. 29, 2006

(30) Foreign Application Priority Data

Jun. 16, 2003   (DE) ................. 103 26 928

(51) Int. Cl.
*B23C 5/26* (2006.01)
(52) U.S. Cl. ............... 409/234; 409/232; 82/160
(58) Field of Classification Search ........... 409/234, 409/232; 82/158, 160; 408/239 R; 279/155
See application file for complete search history.

(56) References Cited

U.S. PATENT DOCUMENTS

| | | | |
|---|---|---|---|
| 3,573,876 A * | 4/1971 | Powell | 409/232 |
| 4,723,878 A | 2/1988 | Kelm et al. | |
| 4,729,702 A * | 3/1988 | Kelm | 409/234 |
| 4,813,829 A | 3/1989 | Koppelmann | 409/136 |
| 4,909,684 A * | 3/1990 | Kelm et al. | 409/234 |
| 4,948,309 A * | 8/1990 | Newland et al. | 409/234 |
| 5,167,478 A * | 12/1992 | Ramunas | 409/234 |
| 5,346,344 A | 9/1994 | Kress et al. | |
| 5,492,441 A * | 2/1996 | Schuerfeld | 409/234 |
| 5,851,091 A * | 12/1998 | Klement | 409/232 |
| 6,109,152 A | 8/2000 | Hecht | |
| 6,415,696 B1 * | 7/2002 | Erickson et al. | 82/160 |

FOREIGN PATENT DOCUMENTS

| | | |
|---|---|---|
| DE | 41 17 765 A | 12/1992 |
| DE | 19818148 A | 10/1999 |
| DE | 102 41 860 A | 3/2004 |
| EP | 0 291 477 A | 11/1988 |

* cited by examiner

*Primary Examiner*—Erica Cadugan
(74) *Attorney, Agent, or Firm*—Harness, Dickey & Pierce, P.L.C.

(57) ABSTRACT

The invention relates to an interface between two parts of a tool system, in particular to a metal cutting tool (1). Said interface comprises a holder (3) provided with a cavity (31), an interchangeable head (5) which is arranged on the axial extension of the holder and provided with a projection (33) introducible into the cavity (31) and a clamping device (19) for fixing the interchangeable head (5) to the holder (3). The inventive interface is characterised in that the clamping device (19) is provided with a holding bolt (41) and an eccentric element (21) which axially displaces said bolt and is actuated through a peripheral surface (17) of the metal cutting tool (1).

20 Claims, 5 Drawing Sheets

INTERFACE BETWEEN TWO PARTS OF A TOOL SYSTEM

The invention relates to an interface between two parts of a tool system, in particular a metalworking tool.

Interfaces of the type addressed here are known. This term describes connecting points between parts of a tool system, for example between a connecting piece connectable to a machine tool and a replaceable head, or between a tool part and a spacing piece, or between a spacing piece and an adapter, or between a holder that can be attached to a machine tool and a replaceable head on a metalworking tool. The interface is characterized by a first part configured as a holder which is provided with a recess into which an extension of a second part of a tool system can be inserted, for example a replaceable head provided with an extension. In the case of a metalworking tool with a holder and a replaceable head addressed here, it is possible to use different tools for metal-removal operations on a work piece. Known replaceable heads of the type addressed here have an extension configured as a short taper which can be inserted into the holder. The replaceable head and the holder have flat surfaces in the area of the interface which are preferably configured as annular surfaces and stand perpendicular to the center axis of the interface, here of the metalworking tool. This design of the interface is distinguished by the extremely precise alignment of the replaceable head to the holder, resulting in great rigidity in the area of the interface. The interface also has a clamping fixture which usually comprises a differential screw with two opposite threads (left-hand/right-hand thread). The differential screw engages the replaceable head with one threaded area and the holder with the other threaded area. When the differential screw is rotated, the replaceable head is shifted in the direction of its longitudinal axis which coincides with the center axis of the metal-cutting tool, which pulls the extension into the recess on the holder. By configuring the extension as a short taper, the wall of the holder in the area of the recess, which is configured as a female taper, undergoes minimal elastic expansion until the flat surfaces of the holder and the replaceable head adjoin each other. With a rotational motion of the differential screw in the opposite direction, the extension of the replaceable head is pushed out of the recess in the holder so that the replaceable head is ejected. The differential screw has actuating surfaces on its end faces, for example, a hexagon-shaped internal surface into which a suitable tool can be inserted. However, it has proved disadvantageous with replaceable heads in many cases that access from the front to operate the differential screw cannot be implemented, for example, with a very small-diameter replaceable head, with replaceable heads configured as solid drill bits, with router bits whose blades extend beyond the axis of rotation, and similar. In these cases, the clamping screw configured as a differential screw has to be actuated from the holder side. To do this, the holder has to be removed from the machine tool, which results in long downtimes. The disadvantage is the more serious if the holder acting as the connection to the machine tool is configured as a flange which has to be aligned each time after assembly. With long tools or tool combinations, very long wrenches have to be used to operate the differential screw which usually cannot produce the required torque because of their length. When the differential screw has very fine threads, it requires several turns until the parts of the tool system making up the interface, the replaceable head and the holder, are rigidly connected, that costs time.

The object of the invention is therefore to create an interface which is easily accessible and permits rapid clamping.

To achieve this object, an interface is proposed that comprises, for example, a holder and a replaceable head, having a clamping device with a pull stud and an eccentric cam coacting with it. Preferably the pull stud is located in the replaceable head and the eccentric cam in the holder, where the pull stud represents a continuation of an extension of the replaceable head. When the eccentric cam is actuated, the pull stud is shifted in an axial direction, that is, along the center axis of the interface so that the holder and the replaceable head can be clamped together. The eccentric cam is accessible through a peripheral surface of the parts of the tool system that are connected in the area of the interface. So it is no longer necessary to operate the clamping fixture from the front of one part or from the side of a part facing away from the front. It is possible to produce tools with a closed end face. It is additionally no longer necessary to remove a tool equipped with an interface of this type from a dedicated bracket on a machine tool or to dismantle it to operate the clamping fixture.

The invention is explained in more detail in what follows with reference to the drawings.

Figure 1:
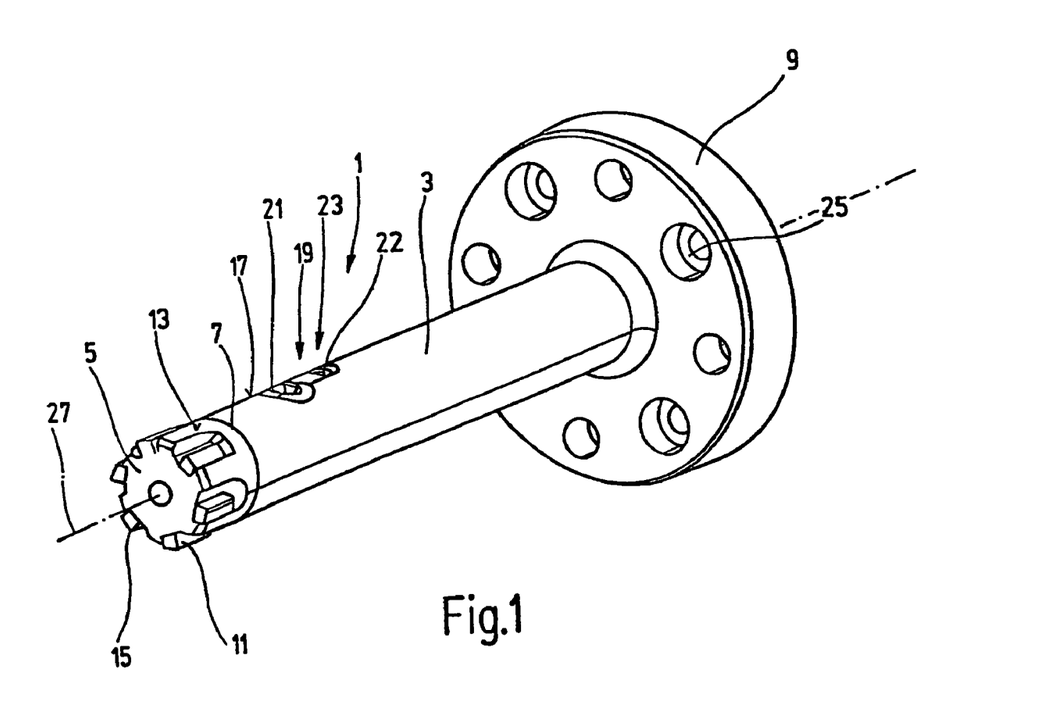
FIG. 1 shows a first embodiment of an interface of a tool system having a holder and a replaceable head in the assembled state.

FIG. 1 shows an interface of a tool system which, as an example, is configured here as a metalworking tool 1. It comprises as the first part a holder 3 and as the second part a replaceable head 5. It can be seen from a line 7 running in the circumferential direction that the holder 3 and the replaceable head 5 can be separated.

In the embodiment shown here, the holder 3 is provided with an alignable flange 9 by means of which the tool system, in this case the metalworking tool 1, can be attached to a machine tool. The flange 9 can also be replaced by a taper with which the holder 3 can be connected to a tapered holder of a machine tool.

The flange 9 has a series of holes 25, the center axes of which run parallel to the center axis 27 of the metalworking tool 1 and through which the bolts can be passed which engage a mounting component of a machine tool.

The replaceable head 5 has at least one, here six cutters 11 evenly spaced in the circumferential direction which have blades with cutting edges 15 extending beyond the peripheral surface 13 of the replaceable head 5. The cutters 11 can be brazed into the main body of the replaceable head 5 or be fastened in another way, for example, with clamping claws. It is also possible to manufacture the knife head from one piece and to grind the blades into its main body, as is the case with a router bit.

The replaceable head 5 shown here by way of example is a reamer. It can also be configured as a router bit or drill bit or similar. In the interface shown here therefore, one of the parts of the tool system is equipped as a metal-removing tool with which chips can be removed from the surface of a work piece or from a surface of holes drilled in a work piece.

The peripheral surface 13 of the replaceable head 5 continues in this embodiment in the peripheral surface 17 of the holder 3 so that no step is formed in the area of the line 7. The replaceable head 5 here forms the axial continuation of the holder 3.

A clamping device 19 is set into the peripheral surface 17 of the holder 3, comprising an eccentric cam 21 which is secured by a safety element 23 retained by a screw 22 in such a way that it cannot fall out of the holder.

Figure 2:
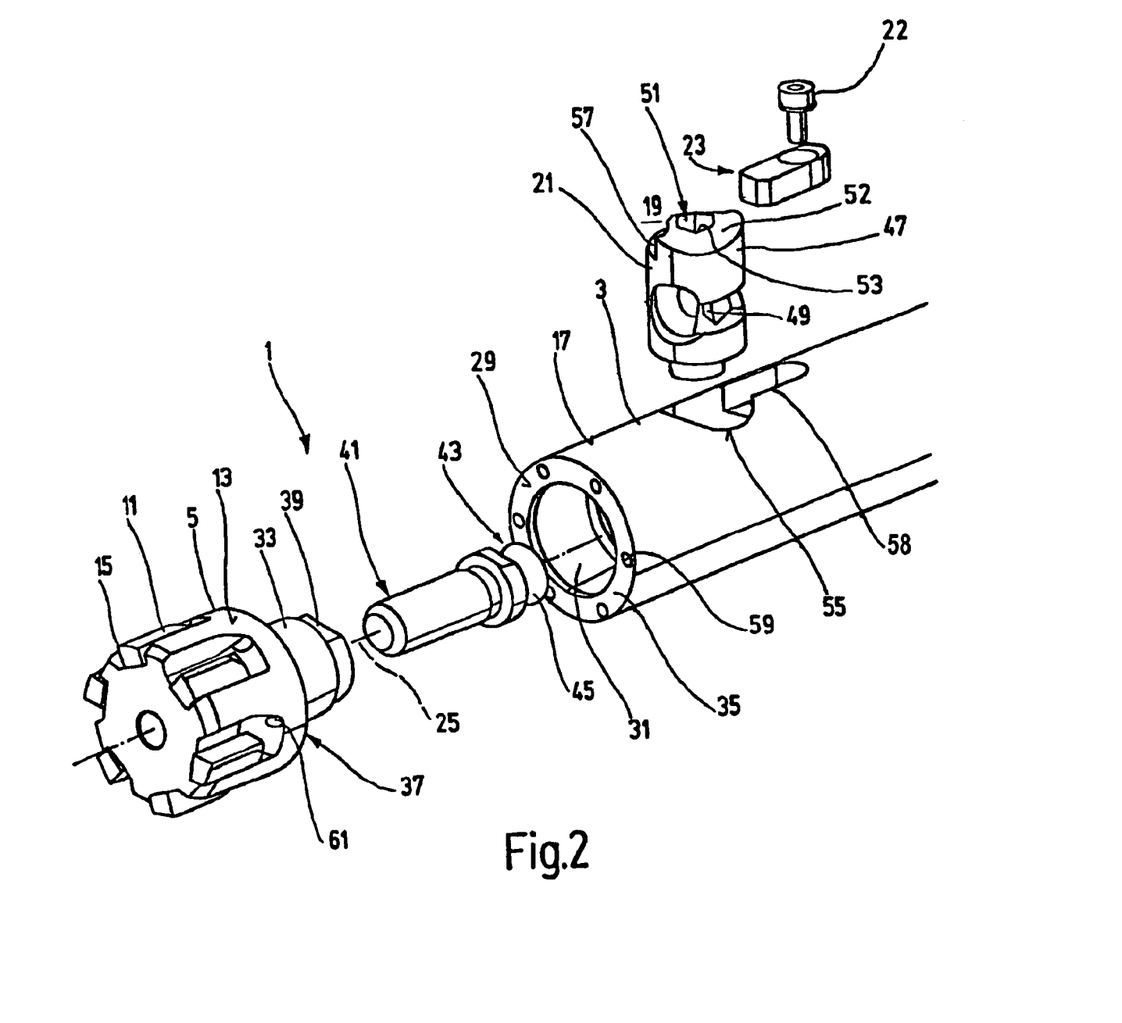
FIG. 2 shows the front side of the tool system shown in FIG. 1 in an exploded view.

The front part of the tool system, here configured as a metalworking tool 1, is reproduced in FIG. 2 in an exploded view. The same parts are given the same reference numbers so that reference is made to the description for FIG. 1 to avoid repetition.

The holder 3 has a recess 31 introduced into its end 29 which an extension 33 of the replaceable head 5, preferably configured as a short taper, engages. With this type of design for the extension 33, the inner surface of the recess 31 is similarly conical in configuration, a female taper. The male taper surface of the extension 33 and the female taper surface of the recess 31 are matched to each other in such a way that when the holder 3 and the replaceable head 5 are clamped together, a self-locking effect is achieved.

A flat surface configured as an annular surface 35 surrounding the recess 31 can be seen on the end 29 of the holder 3, which lies in an imaginary plane to which the center axis 25 of the metalworking tool 1 stands perpendicular. The replaceable head 5 is also furnished on its rear side facing the end 29 with a flat surface configured as an annular surface 37 which is also located in an imaginary plane to which the center axis 25 of the metalworking tool 1 stands perpendicular. In the assembled and clamped state of the interface, the annular surfaces 35 and 37 are solidly in facial contact with each other, resulting in a precisely accurate alignment between holder 3 and replaceable head 5, which is further ensured by the extension 33. The extension 33 effects the radial alignment and the annular surfaces 35, 37 effect the axial alignment.

The extension 33 is furnished with at least one flat 39 inset into its peripheral surface which coacts with a corresponding flat in the interior of the recess 31 in such a way that a predetermined rotational position of the replaceable head 5 results with respect to the holder 3. This means that the extension 33 can only be inserted in a specified rotational position into the recess 31, thus giving a defined rotational position between holder 3 and replaceable head 5.

A pull stud 41 can be installed in the replaceable head 5. It is rigidly connected to the replaceable head or its extension 33, for example, by a threaded connection. A shrink fit, a bonded or brazed connection is also conceivable to achieve an interference fit instead of the positive connection. It is furthermore also possible to configure the extension 33 and the pull stud 41 as one piece.

A boss 43, also termed a mushroom-shaped boss, which has a first clamping surface 45 is furnished on the end of the pull stud facing the holder 3.

With the interface in the assembled state, the boss 43 is spaced at a distance from the annular surface 37 such that the clamping device 19 can coact with the boss 43, which will be discussed more fully in what follows. Correspondingly, the clamping device 19 is positioned at a distance from the annular surface 35 such that it can coact with the boss 43 on the pull stud 41.

The clamping device 19 has an eccentric cam 21 which comprises an essentially cylindrical outer surface 47. A hollow space 49 in the interior of the eccentric cam 21 is accessible through this outer surface.

A recess 51 with actuating surfaces 53 by which the eccentric cam 21 can be rotated, for example by means of an Allen wrench, is set into the upper end face 52 of the eccentric cam. Depending on the shape of the actuating surfaces 53, screwdrivers or Torx wrenches can be used. It is crucial that torque can be applied to the eccentric cam 21 by means of a tool.

The eccentric cam 21 is set into a hole 55 passing through the main body of the holder 3 perpendicular to the center axis so that it is accessible from both sides. To this end, the eccentric cam 21 is also furnished with a recess with actuating surfaces on the end face located opposite to the end face 52 shown here. In order to prevent injuries, the length of the eccentric cam 21 is preferably matched to the diameter of the holder 3 such that it does not protrude beyond its peripheral surface.

With the metalworking tool 1 in its assembled state, the boss 43 engages the hollow space 49 of the eccentric cam 21 so that it cannot fall out of the hole 55. In the disassembled state, the eccentric cam 21 is retained by means of the safety element 23 in the main body of the holder 3. The safety element is inserted into an elongated recess 58 in the peripheral surface 17 of the holder 3 and overlaps a stepped-back area 57 of the end face 52 of the eccentric cam 21.

It can be seen from the drawing from FIG. 2 that the annular surface 35 is furnished with several openings 59 distributed at regular intervals which align with holes in the annular surface 37, not shown here, so that coolant can be carried through the openings 59 to the cutters 11. One exit port 61 is assigned to each cutter in the embodiment of the replaceable head 5 shown here. The flat 39 mentioned above of the extension 33 of the replaceable head 5 serves to ensure an precise rotational alignment between holder 3 and replaceable head 5 so that the supply of coolant is maintained.

From FIGS. 1 and 2 it can be seen that with the tool system shown here in its configuration as a metalworking tool 1, the replaceable head 5 represents an axial continuation of the holder 3. In the area of the interface explained here, two parts of a tool system are clamped to each other in the axial direction, where annular surfaces 35 and 37 assigned to each part lie flat against each other and exact alignment of the parts and great rigidity in the interface are ensured. When the extension 33 is designed as a short taper, the casing of the holder 3 in the area of the recess 31 undergoes minimal elastic expansion.

It can be seen that with a replaceable head designed to be of a suitable length, the eccentric cam 21 can also be incorporated into it, when the holder 3 then has to be designed with an extension and a pull stud, as was shown from the example of the replaceable head 5. This then means that for operation of the interface of the type shown here, it is unimportant in which of the two parts the recess for the extension is furnished and on which of the elements the extension is formed.

In the area of the interface, a particularly exact alignment of the parts of a tool system is achieved if the extension 33 is configured as a short taper. In addition, this makes it very compact in construction.

It can be seen furthermore from FIG. 2 that the number of coolant ducts, the openings 59 of which are visible in the area of the annular surface 35, is preferably matched to the number of cutters 11 in the replaceable head 5 so that each blade can be optimally cooled. At the same time, good chip removal is ensured. In the embodiment shown here, six cutters 11 and six openings 59 are shown through which the coolant can be taken to six exit ports. Correspondingly more or fewer coolant ducts are provided when more or fewer cutters are used.

The essential parts of the clamping device 19 are explained with reference to FIGS. 4 and 5. Identical parts are given the same reference numbers so that reference is made to the description accompanying the preceding figures.

Figure 3:
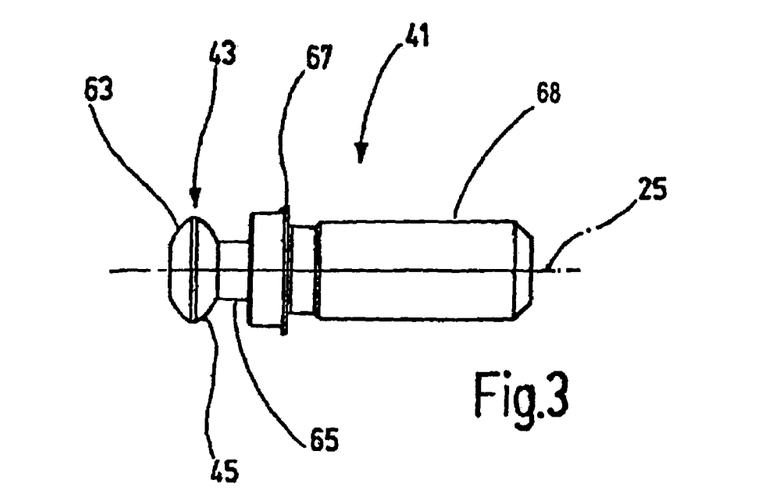
FIG. 3 shows a pull stud for the clamping fixture of the interface from FIGS. 1 and 2 in a side view.

FIG. 3 shows the pull stud 41 in a side view. The center axis of the pull stud 41 coincides with the center axis 25 of the tool system addressed here, a metalworking tool 1. On the left side of the pull stud 41 the boss 43 can be seen which has two surfaces inclined in opposite directions to one another, that is to say a first clamping surface 45 pointing to the right and an ejector surface 63 pointing to the left. The two surfaces include an acute angle with the center axis 25 which is greater than 45°. The angles of the two surfaces do not have to be the same. The function of the ejector surface 63 is described in more detail in what follows.

On the right, adjoining the first clamping surface 45, is a cylindrical area 65; the outside diameter of which is smaller than the outside diameter of the boss 43. The first clamping surface 45 runs between the outermost outside point of the boss 43 to the cylindrical area 65.

At a distance from the boss 43, as viewed from the boss 43, there is a stop ring 67 on the other side of the cylindrical area 65 which is formed by an outwardly projecting annular shoulder, which can also be discontinuous.

Adjoining on the right, thus at a greater distance from the boss 43, there is a threaded area 68 with an external thread which coacts with an internal thread in the extension 33 of the replaceable head 5 and serves to anchor the pull stud in the extension 33.

Figure 4:
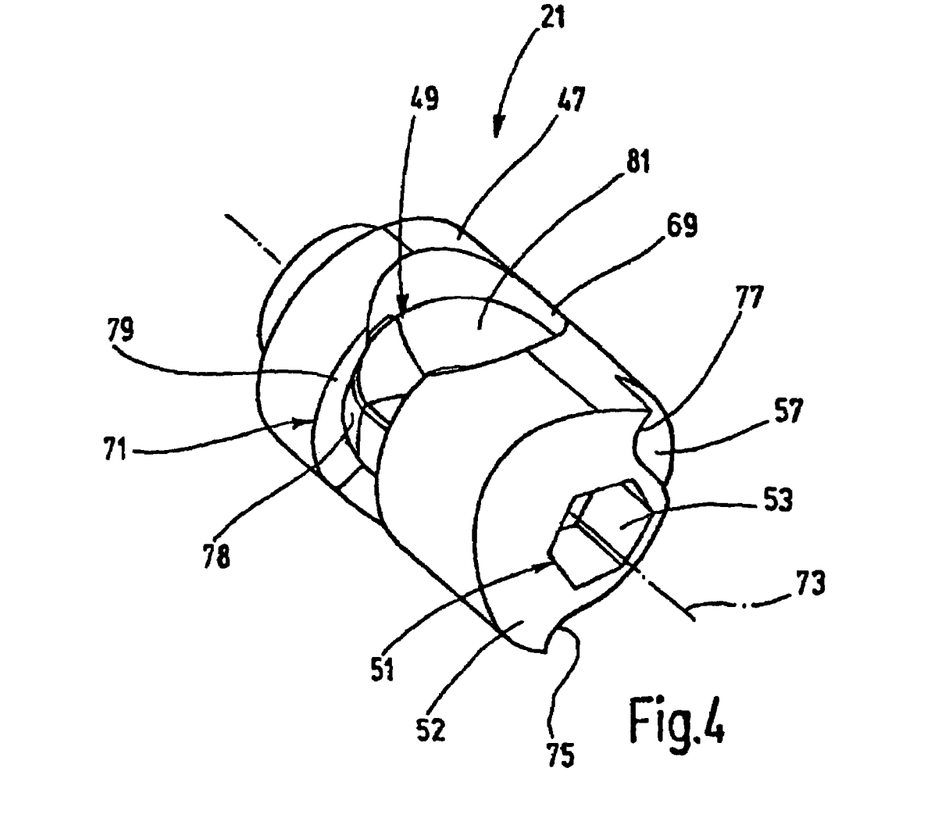
FIG. 4 shows an eccentric cam for the clamping fixture in a perspective view.

FIG. 4 shows the eccentric cam 21 in an enlarged perspective view. The hollow space 49 and the exterior surface 47 can be seen through which the hollow space 49 is accessible. From the outer surface 47, a circular hole 69 leads into the hollow space 49, the inside diameter of which is slightly larger than the outside diameter of the boss 43 so that it can be introduced through the exterior surface 47 and through the hole 69 into the hollow space 49. Adjoining the hole 69 is a slot 71 running in the peripheral direction of the eccentric cam 21, whose width measured in the direction of the axis of rotation of the eccentric cam 21 is slightly larger than the diameter of the cylindrical area 65 of the pull stud 41.

A recess 51 with actuating surfaces 53 is incorporated into the end face 52 of the eccentric 21. A stepped-back area 57 allows the safety element 23 to engage, which was already explained in reference to FIG. 2.

Stops 75 and 77 are formed by the stepped-back area 57 which restrict the rotational movement of the eccentric 21 around its axis of rotation 73 because the stops 75 strike the safety element 23 after a certain rotational movement. For the eccentric cam 21, the result is a restricted ability to rotate around an angle of 120° from stop to stop. This provides rapid clamping in the area of the interface.

It is possible to look into the hollow space 49 through the slot 71 and see a second clamping surface 78 here. It can be seen in FIG. 4 that the thickness of the wall 79 between outer surface 47 and hollow space 49 in the eccentric cam 21 increases from top to bottom so that the distance of the second clamping surface 78 to the axis of rotation 73 decreases from top to bottom.

The drawing from FIG. 4 also shows an additional area on the inner surface of the cavity, an ejector surface 80.

Figure 5:
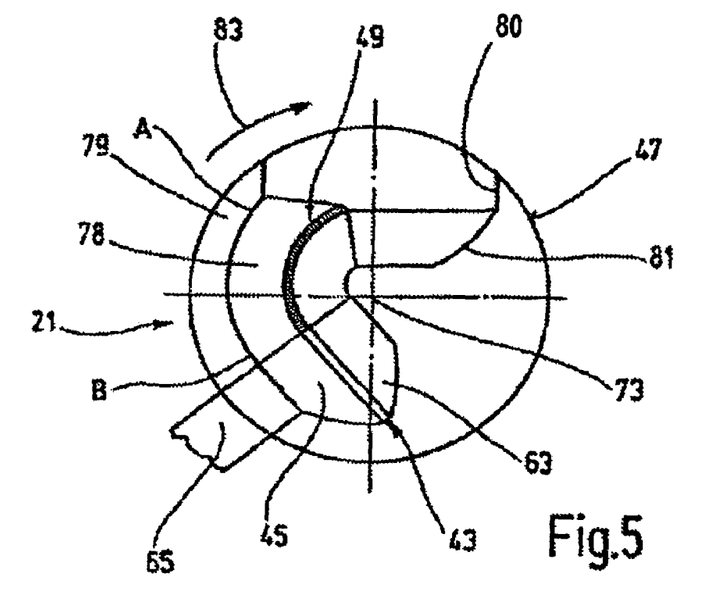
FIG. 5 shows a cross-section through the eccentric cam from FIG. 4.

FIG. 5 shows a cross-section through the eccentric cam 21 where the plane of the section runs perpendicular to the axis of rotation 73 and lies in the area of the slot 71.

The sectional drawing shows the hollow space 49 in the interior of the eccentric cam 21 which is accessible through the hole 81. The second clamping surface 78 can be seen in the sectional drawing. It can also be seen that the wall 79 between outer surface 47 and hollow space 49 is thinner in area A than in area B so that the spacing of the second clamping surface 78 at the top in area A (in the fourth quadrant) is greater than the spacing of the second clamping surface 78 in area B (in the third quadrant).

The cylindrical area 65 of the pull stud 41 is still indicated in FIG. 5, in addition to a part of the boss 43 with the first clamping surface and the ejector surface 63.

The first clamping surface 45 of the boss 43 coacts with the second clamping surface 78 of the eccentric cam 21 and in such a way that with a rotational movement of the eccentric cam 21 in a clockwise direction, indicated by arrow 83, the first clamping surface 45 is guided closer and closer to the axis of rotation by the second clamping surface 78. As a result, the boss 43 is shifted axially toward the axis of rotation. Tractive forces act on the pull stud 41 in consequence through the boss 43 so that, in the embodiment in accordance with FIGS. 1 and 2, the replaceable head of the metalworking tool 1 is pulled toward the holder 3.

With a counter-clockwise rotational movement of the eccentric cam 21, the second clamping surface 78 is shifted outward relative to the axis of rotation 73, so that the tractive forces on the pull stud 41 are reduced. Finally the ejector surface 80 of the eccentric cam 21 pushes on the ejector surface 63 of the pull stud 41 and pushes it radially outward away from the axis of rotation 73 so that, in this operating position of the eccentric cam 21, the pull stud 41, and with it the extension 33 of the replaceable head 5, is pressed out of the recess 31 in the holder 3. This cancels the self-locking action in the connecting area between extension 33 and the wall of the recess 31 so that the replaceable head can be removed without difficulty from the holder 3.

Figure 6:
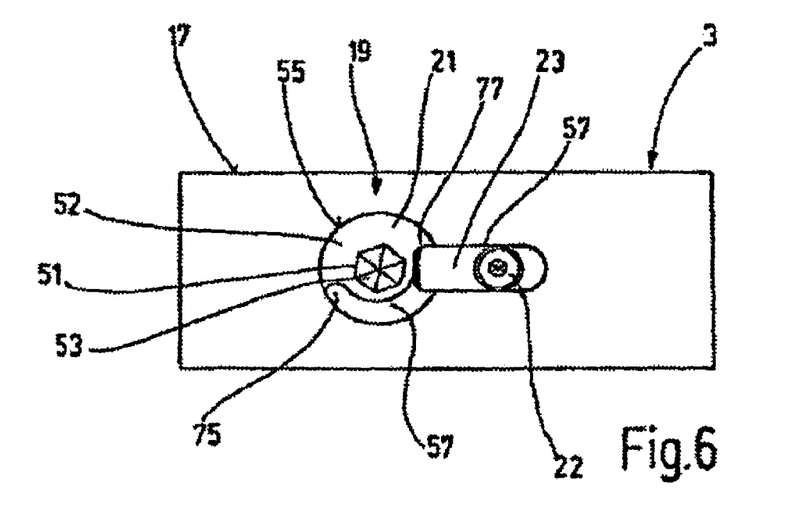
FIG. 6 shows a plan view onto the eccentric cam in the installed state.

FIG. 6 shows a section of the holder 3 and the installed clamping device 19 in perpendicular plan view. The eccentric cam 21 is clearly visible inserted into a hole 55. The recess 51 with its actuating surfaces 53 can also be seen introduced into the end face 52. The set-back area 57 on which the safety element 23 lies can also be seen. The rotational movement of the eccentric cam 21 is restricted by the two limiting surfaces 75 and 77.

It can also be seen that the safety element 23 is locked by means of the screw 22 in the main body of the holder 3.

The plan view from FIG. 6 shows clearly that the clamping device 19 is accessible through the peripheral surface 17 of the holder 3.

Figure 7:
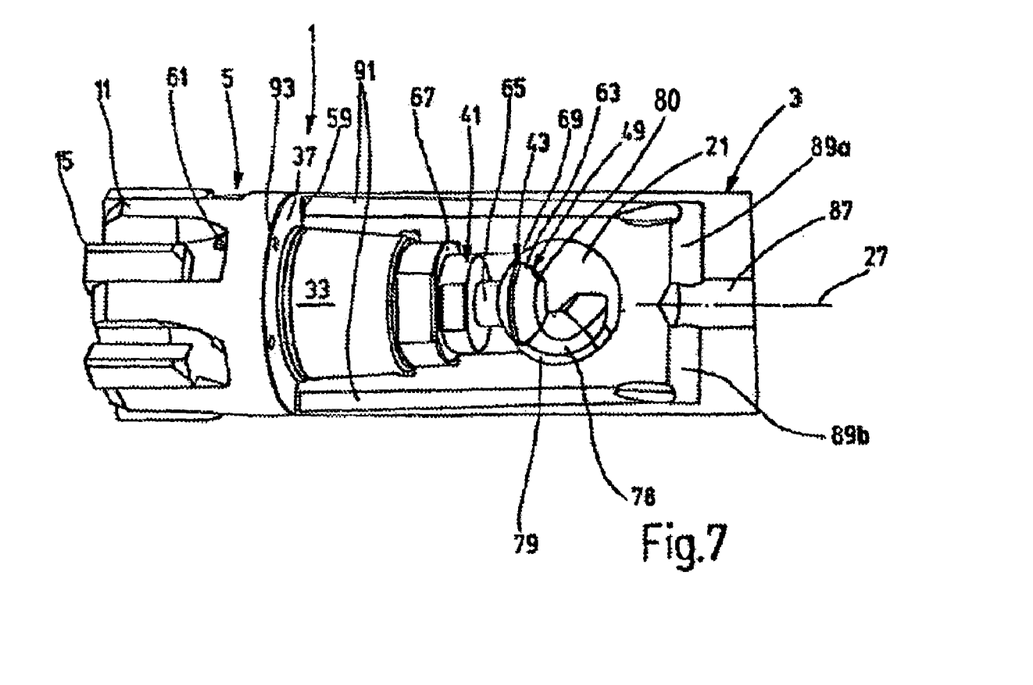
FIG. 7 shows a partial longitudinal section through an interface in the installed but not clamped state.

FIG. 7 shows the interface of two parts of a tool system in a partial longitudinal section. The front part of a tool system configured as a metal-working tool 1 can be seen here with a first part, the holder 3, and a second part, the replaceable head 5. Parts which were explained with reference to previous figures have the same reference numbers as those given above. They are not explained in greater detail here.

In FIG. 7, the eccentric cam 21 is shown again in cross-section so that in this regard reference is made to the explanations for FIG. 5. In the drawing in accordance with FIG. 7, the replaceable head 5 is merely inserted into the holder 3, when the boss 43 of the pull stud 41 projects through the hole 69 into the hollow space 49 of the eccentric cam 21 and the ejector surface 63 of the boss 43 abuts the ejector surface 80 of the hollow space 49.

FIG. 7 shows that a drill hole 87 which is part of a central coolant and lubricant line is introduced into the main body of the holder 3 aligning with its center axis 27. Sections of holes 89a and 89b which intersect the drill hole 87 run radially to drill hole 87. Passages 91 lead from these hole sections 89a, 89b to the annular surface 37 to the previously explained openings 59 provided there which align with openings 93 in the annular surface 37 of the replaceable head 5. Coolant and lubricant fed into these opening 93 leave the exit ports 61 where one exit port 61 is assigned to each cutter 11 of the replaceable head 5.

The number of passages 91 is matched to the number of cutters 11 in order to supply a flow of coolant/lubricant to each cutter.

Figure 8:
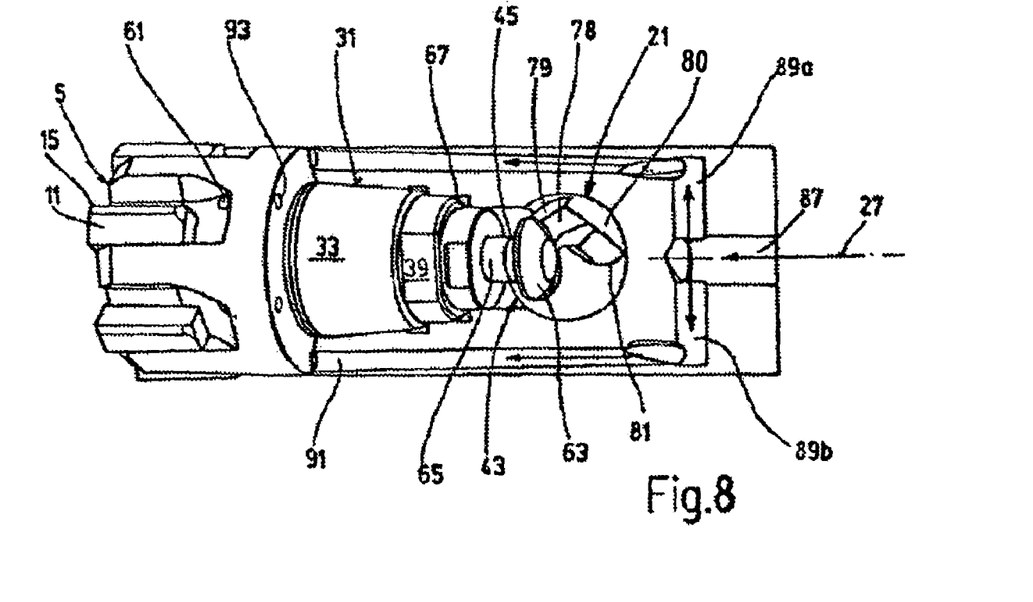
FIG. 8 shows the interface from FIG. 7 in the clamped state.

FIG. 8 shows the two parts of the tool system, the holder 3 and the replaceable head 5 of the metal-working tool 1, in the clamped position. The same parts are given the same reference numbers, so reference is made to the description above.

The only difference compared with the drawing in accordance with FIG. 7 is that the eccentric cam 21 has been rotated in a clock-wise direction, where the first clamping surface 45 of the boss 43 coacts in such a way with the second clamping surface 78 of the eccentric cam 21 that the pull stud 41 and with it the replaceable head 5 is pulled in the axial direction and to the holder 3. Consequently, the annular surfaces 35 and 37 of the holder 3 and the replaceable head 5 butt against each other with great force so that a tight connection is made in the transition area of the interface, and coolant/lubricant can be taken through the drill hole 87, the hole sections 89a, 89b and the passages 91 to the exit ports 61, which is indicated in FIG. 8 by arrows.

To ensure that the openings 59 in the annular surface 35 of the holder 3 align with the openings 93 in the annular surface of the replaceable head 5, at least one flat 39 is provided on the extension 33 which coacts with a corresponding flat in the recess 31 and the holder 3 and ensures a defined rotational alignment of the holder 3 relative to the replaceable head 5.

From the drawings in accordance with FIGS. 7 and 8, it is again clear that the depth to which the boss 43 penetrates into the holder 3 must be matched exactly to the position of the eccentric cam 21 and the appropriate clamping surfaces. Exact positioning of the pull stud 41 in the extension 33 of the replaceable head 5 is ensured by the stop ring 67 on the pull stud 41.

It also becomes clear from FIGS. 7 and 8 that when the interface is clamped, the wall of the holder 3 surrounding the recess 31 is slightly expanded with the penetration of the truncated cone-shaped extension 33 of the replaceable head 5. The angles of the wall of the recess 31 and of the extension 33 relative to the center axis of the metal-working tool 1 are selected such that, as already stated, a self-locking action takes place here. The angles between the two clamping surfaces 45 and 78 are also selected correspondingly to ensure a self-locking action here as well and prevent the eccentric cam 21 from rotating unintentionally and reducing or even canceling the clamping forces.

The drawings in FIGS. 7 and 8 also show that the interface is structurally extremely compact and can be used for tool systems with a small outside diameter, where extensions 33 can also be used which are not truncated cones but cylindrical in shape or similar.

It also shows that the clamping device 19 is extremely simple in construction and is thus not prone to malfunctions.

What is claimed is:

1. An interface between two parts of a metal-cutting tool, with a retainer comprising a recess, and an exchangeable tool head, comprising an appendix, which can be inserted into the recess, the exchangeable tool head is arranged in axial prolongation to the retainer, and with a fixture to fix the exchangeable tool head on the retainer, characterized in that the fixture comprises a tension-bolt and an eccentric cam element, wherein the eccentric cam element is operable at a peripheral area of the retainer, and that the tension-bolt comprises a pull stud, which can be inserted into the eccentric cam element, comprising a first clamping surface, and that the eccentric cam element comprises a second clamping surface, wherein a distance between the second clamping surface to a rotary axis of the eccentric cam element varies, wherein the first clamping surface of the tension-bolt is formed convex and the second clamping surface of the eccentric cam element is formed concave, and wherein the eccentric cam element includes stops restricting an amount of rotational movement of the eccentric cam element therebetween.

2. The interface in accordance with claim 1, wherein the pull stud includes a boss having the first clamping surface, the boss can be introduced into the eccentric cam element.

3. The interface in accordance with claim 1, wherein the pull stud has a center axis running in the direction of a center axis of the metal-cutting tool.

4. The interface in accordance with claim 1, wherein the first clamping surface includes an acute angle to a center axis of the pull stud.

5. The interface in accordance with claim 1, wherein the pull stud is connected to the appendix of the tool head or is formed in one piece with same.

6. The interface in accordance with claim 1, wherein the pull stud has a stop ring.

7. The interface in accordance with claim 1, further comprising a safety element disposed on the retainer, wherein a portion of the safety element abuts one of the stops on the eccentric cam element so as to inhibit rotation of the eccentric cam element in the retainer.

8. The interface in accordance with claim 1, wherein the pull stud and the eccentric cam element each have an ejector surface.

9. The interface in accordance with claim 1, wherein the rotary axis of the eccentric cam is essentially perpendicular to a center axis of the metal-cutting tool.

10. The interface in accordance with claim 1, wherein the eccentric cam element has a hollow space accessible from a radial side of the eccentric cam element and wherein the second clamping surface includes an acute angle relative to the rotary axis of the eccentric cam element.

11. The interface in accordance with claim 1, wherein an ejector surface of the eccentric cam element is part of an interior surface of the eccentric cam element bounding a cavity in the eccentric cam element.

12. The interface in accordance with claim 1, wherein the stops that restrict the rotational movement of the eccentric cam element are in the form of stop surfaces within the eccentric cam element.

13. The interface in accordance with claim 1, wherein the eccentric cam element has operating surfaces on at least one end face.

14. An interface between two parts of a tool system comprising:
 a holder defining a recess;
 a replaceable head having an extension insertable into the recess so as to extend axially from the holder;
 a pull stud that extends from the replaceable head, the pull stud having a first clamping surface;
 an eccentric cam element rotateably disposed in the holder and accessible through a peripheral surface of the holder, the eccentric cam element having a second clamping surface, wherein a dimension between the second clamping surface and a rotational axis of the eccentric cam element varies, the eccentric cam element configured to receive the pull stud and couple the replaceable head to the holder when the eccentric cam element is rotated; and
 stops formed on the eccentric cam element that restrict an amount of rotation of the eccentric cam element therebetween in the holder.

15. The interface between two parts of a tool system of claim 14, wherein the first clamping surface includes an acute angle to a center axis of the pull stud.

16. The interface between two parts of a tool system of claim 14, wherein the pull stud includes a boss having an ejector surface and the eccentric cam element includes an ejector surface, wherein the eccentric cam element is rotated to a position where the ejector surfaces of the pull stud and the eccentric cam element come into contact to push the replaceable head in an axial direction away from the holder.

17. The interface between two parts of a tool system of claim 14, wherein an axis of rotation of the eccentric cam element is generally perpendicular to a center axis of the replaceable head.

18. The interface between two parts of a tool system of claim 14, wherein the eccentric cam element defines a hollow space accessible from a radial side of the eccentric cam element and wherein the second clamping surface establishes an acute angle relative to an axis of rotation of the eccentric cam element.

19. The interface between two parts of a tool system of claim 18, further comprising a stop ring that extends from the pull stud, the stop ring abuts a portion of the eccentric cam element when the pull stud is received in the eccentric cam element to operably position a boss on the pull stud in the hollow space defined by the eccentric cam element.

20. The interface between two parts of a tool system of claim 14, further comprising a safety element disposed on the holder, wherein a portion of the safety element abuts one of the stops on the eccentric cam element so as to inhibit rotation of the eccentric cam element in the holder.

* * * * *

UNITED STATES PATENT AND TRADEMARK OFFICE
CERTIFICATE OF CORRECTION

PATENT NO. : 7,322,779 B2  Page 1 of 1
APPLICATION NO. : 10/560944
DATED : January 29, 2008
INVENTOR(S) : Dieter Kress et al.

It is certified that error appears in the above-identified patent and that said Letters Patent is hereby corrected as shown below:

Title Pg, Item (73) Assignee, should be corrected from "MAPAL Fabrik fur Prazisionswerkzeuge" to:
--MAPAL Fabrik für Präzisionswerkzeuge Dr. Kress KG--

Signed and Sealed this

Twenty-fourth Day of November, 2009

David J. Kappos
*Director of the United States Patent and Trademark Office*